Oct. 20, 1925.  
J. W. SCHADE  
APPARATUS FOR GAUGING VEHICLE PARTS  
Filed May 20, 1924

1,557,882

Inventor  
James W. Schade  
By Robert M. Pierson  
Atty.

Patented Oct. 20, 1925.

1,557,882

UNITED STATES PATENT OFFICE.

JAMES W. SCHADE, OF AKRON, OHIO, ASSIGNOR TO THE B. F. GOODRICH COMPANY, OF NEW YORK, N. Y., A CORPORATION OF NEW YORK.

APPARATUS FOR GAUGING VEHICLE PARTS.

Application filed May 20, 1924. Serial No. 714,671.

*To all whom it may concern:*

Be it known that I, JAMES W. SCHADE, a citizen of the United States, residing at Akron, in the county of Summit and State of Ohio, have invented a certain new and useful Apparatus for Gauging Vehicle Parts, of which the following is a specification.

This invention relates to methods and devices for gauging or measuring wheels and related parts of a vehicle and has particular application in determining whether a felloe, rim or tire of an automobile may be substituted by a felloe, rim or tire of different dimensions, as in changing over from present-standard equipment to "balloon" tire equipment, with sufficient clearance of fenders, brake drums, and adjacent parts.

My general object is to provide an improved device whereby such determination may be readily and accurately made. A more specific object is to provide for conveniently and quickly making such determination at all parts of the wheel's orbit.

I accomplish these objects by providing a template or the like having a portion adapted for positioning it, and preferably for securing it, upon a wheel part which is to be replaced, and having a portion representing the relative position, and preferably a substantial part of the transverse contour, of the felloe, rim or tire which is to be installed.

Figure 1:
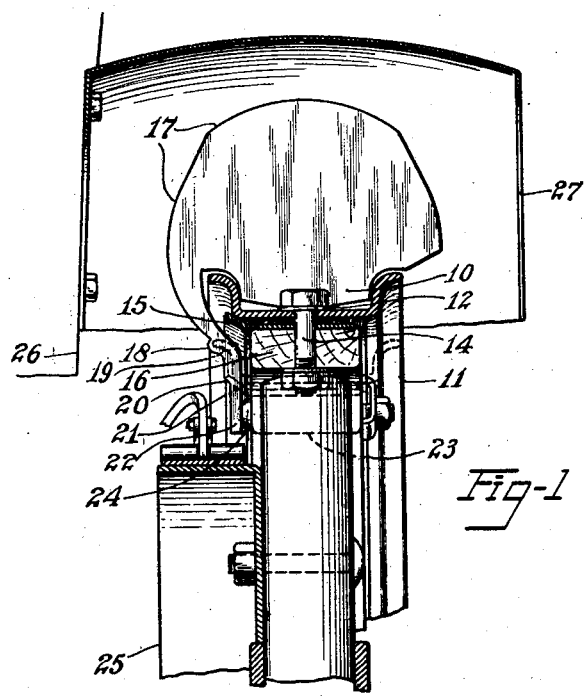
Fig. 1 is a vertical, transverse section of parts of an automobile with a preferred form of my improved gauge in place thereon.
Figure 2:
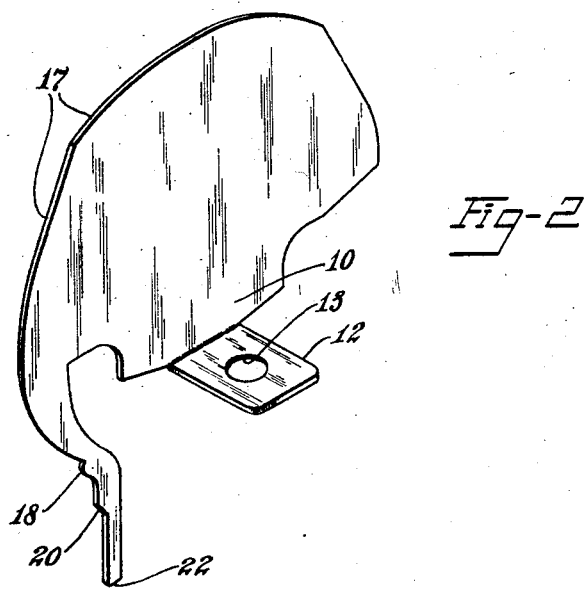
Fig. 2 is a perspective view of the gauge.

Referring to the drawings, the gauge is in the form of a template having a base portion 10 adapted to fit between the side flanges of the standard tire-carrying rim 11, the template being disposed transversely of the wheel, and bent at a right-angle from said base portion is an attachment foot 12 adapted to seat upon the floor of the rim 11 and formed with a bolt hole 13 for securing the template to the rim by means of a bolt 14 mounted in said hole and in the valve stem holes of the rim 11, the felloe-band 15 and the felloe 16.

Above the base portion 10 the template is formed with a peripheral portion 17 which, in the embodiment here shown, represents the lateral contour and the position of a tire of a given overall diameter and a given large cross-section as it would be if mounted, with suitable wheel parts, in place of the standard equipment. The template is also formed with a leg extending radially inward past the vehicle side of the rim and felloe structure and formed, in continuation of the tire representation 17, with a projection 18 whose margin, preferably with a substantial allowance for tolerance, as shown, represents the position which would be occupied by a carrying rim suitable for the large size tire, such position of the rim being shown in dotted lines of 19 in Fig. 1. The leg of the template is also formed with a sloping shoulder 20 representing the position of the felloe-band, shown in dotted lines at 21, which would be suitable for the large tire, and the extremity 22 of the leg represents the radially inner limit of a suitable felloe, whose cross-sectional outline is dotted in at 23, and of felloe bolts such as 24 mounted in the felloe.

The template is thus adapted to determine what clearance would be provided for the salients of the proposed wheel assembly with relation to the brake drum 25, the car body 26, the fender 27, and other vehicle parts.

By mounting the template as shown in Fig. 1 and rotating the wheel, the clearances of the proposed wheel assembly throughout the wheel's orbit may be readily determined.

While I have here shown, by way of illustration, a non-adjustable template especially formed for use with relation to a change from one specific size and type of equipment to another specific size and type, my invention may be variously modified without departing from its scope, and I do not wholly limit my claims to the exact form thereof which is here shown and described.

I claim:

1. A wheel gauge comprising a portion adapted to be positioned upon the periphery of a wheel structure and a portion adapted, when the gauge is so positioned, to represent the position which would be occupied by a substituted wheel part of determinate dimensions.

2. A wheel gauge comprising a portion adapted to be positioned upon the periphery of a wheel structure and a portion formed with an outline adapted, when the gauge is so positioned, to represent salients of the transverse contour of a substituted wheel assembly.

3. A wheel gauge comprising a portion adapted to be positioned upon the periphery of a wheel structure and a portion adapted, when the gauge is so positioned, to represent the position which would be occupied by a substituted wheel part of determinate dimensions and means for clamping the gauge upon the wheel structure.

4. A wheel gauge comprising a portion adapted to seat upon an automobile, tire-carrying rim, a portion adapted, when the gauge is so seated, to represent a salient of the transverse contour of a substituted wheel part, and means adapted to be mounted in the valve-stem hole of said rim for securing the gauge in place.

In witness whereof I have hereunto set my hand this 17th day of May, 1924.

JAMES W. SCHADE.